United States Patent
Sumi et al.

(10) Patent No.: US 8,827,024 B1
(45) Date of Patent: Sep. 9, 2014

(54) MOTORCYCLE

(71) Applicant: Yamaha Hatsudoki Kabushiki Kaisha, Shizouka-ken (JP)

(72) Inventors: Takahiro Sumi, Shizouka (JP); Shuji Tominaga, Shizouka (JP); Masaomi Suzuki, Shizouka (JP)

(73) Assignee: Yamaha Hatsudoki Kabushiki Kaisha, Shizuoka (JP)

( * ) Notice: Subject to any disclaimer, the term of this patent is extended or adjusted under 35 U.S.C. 154(b) by 0 days.

(21) Appl. No.: 14/039,232

(22) Filed: Sep. 27, 2013

(30) Foreign Application Priority Data

Apr. 19, 2013  (JP) .................................. 2013-088909

(51) Int. Cl.
  *B62K 11/00* (2006.01)
  *B62K 25/02* (2006.01)
(52) U.S. Cl.
  CPC ...................................... *B62K 25/02* (2013.01)
  USPC ..................................... 180/227; 301/111.01
(58) Field of Classification Search
  CPC .... B62K 25/02; B62K 25/10; B62K 2025/00; B62K 2025/02; B62K 2025/025; B62K 2025/04; B62K 2025/048
  USPC .................. 180/219, 227; 280/277, 285, 286; 301/111.01, 113, 114, 115, 120, 122
  See application file for complete search history.

(56) References Cited

U.S. PATENT DOCUMENTS

| | | | |
|---|---|---|---|
| 4,114,918 A * | 9/1978 | Lutz | 280/284 |
| 4,634,139 A | 1/1987 | Watanabe et al. | |
| 4,967,867 A * | 11/1990 | Fuller | 180/219 |
| 5,240,087 A * | 8/1993 | Parker | 180/231 |
| 6,105,700 A * | 8/2000 | Williams et al. | 180/219 |
| 7,052,422 B2 * | 5/2006 | Skidmore et al. | 474/116 |
| 7,287,772 B2 * | 10/2007 | James | 280/288 |
| 7,690,668 B2 * | 4/2010 | Holroyd | 280/285 |
| 7,762,362 B2 * | 7/2010 | Cutkosky et al. | 180/8.5 |
| 8,276,703 B2 * | 10/2012 | Mori | 180/231 |
| 2010/0181742 A1 | 7/2010 | Mori | |

FOREIGN PATENT DOCUMENTS

| | | |
|---|---|---|
| JP | 1986(S61)-081886 A | 4/1986 |
| JP | 2010-167866 A | 8/2010 |
| JP | 2011-201503 A | 10/2011 |
| WO | WO-91/12166 A1 | 8/1991 |

* cited by examiner

*Primary Examiner* — Joseph M Rocca
*Assistant Examiner* — Marc A Scharichi
(74) *Attorney, Agent, or Firm* — Rabin & Berdo, P.C.

(57) ABSTRACT

A motorcycle with enhanced control of a vehicle body is disclosed. The motorcycle includes: a body frame; a rear arm with an elongated hole formed therein; a rear wheel; a shaft; an adjustment mechanism for adjusting the front-to-rear position of the shaft; and a fastener member for fastening the shaft to the rear arm. The adjustment mechanism includes: a first cover member having a first insertion opening formed therein and facing one of the sides of the rear arm; and a second cover member having a second insertion opening formed therein and facing the other one of the sides of the rear arm.

10 Claims, 11 Drawing Sheets

CROSS-SECTION TAKEN ON LINE IV(E)-IV(E)

CROSS-SECTION TAKEN ON LINE V(B)-V(B)

CROSS-SECTION TAKEN ON LINE VII-VII

CROSS-SECTION TAKEN ON LINE IX-IX

MOTORCYCLE

CROSS-REFERENCE TO RELATED APPLICATIONS

This application claims priority to Japanese Patent Application No. 2013-088909, filed on Apr. 19, 2013, the entirety of which is hereby incorporated by reference in its entirety.

BACKGROUND

1. Technical Field

The present invention relates to motorcycles, and more particularly, to motorcycles including an adjustment mechanism for adjusting the position of the shaft.

2. Description of the Background Art

In a motorcycle with a chain for transferring the drive power from the engine, a driving sprocket is provided on the engine and a driven sprocket is provided on the rear wheel. The chain is wound around the driving and driven sprockets. Sometimes, in such a motorcycle, the tension of the chain is adjusted, for example when the chain has increased in length. Typically, a mechanism for adjusting the position of the rear axle is provided at the rear end of a rear arm that supports the rear wheel. The position of the rear axle is adjusted when a rear arm with a different length or a driven sprocket with a different size is used.

For example, JP 2010-167866 A discloses a chain adjust mechanism where an adjuster that supports the rear axle may be moved within a recess formed in the rear end of the rear arm to adjust the position of the rear axle and the tension of the chain. In this chain adjust mechanism, the adjuster is composed of an upper subassembly and a lower subassembly. Thus, as the rear axle is tightened toward the adjuster, the upper subassembly moves upward to be pressed against the upper wall of the recess in the rear arm, while the lower subassembly moves downward to be pressed against the lower wall of the recess in the rear arm. This allows the adjuster, together with the rear axle, to be firmly fastened to the rear arm.

As discussed above, in the motorcycle described in JP 2010-167866 A, the adjuster as well as the rear axle may be firmly fastened to the rear arm. However, some circumstances, such as sport riding or races, may require the rear axle and rear arm to be fastened more firmly to each other to provide better control of the vehicle body.

SUMMARY

An object of the present invention is to provide a motorcycle with enhanced control of the vehicle body.

A motorcycle according to the present invention includes: a vehicle body including a body frame; a rear arm supported by the body frame, the rear arm being rotatable in a top-to-bottom direction, an elongated hole being formed in the rear arm and extending in a front-to-rear direction of a vehicle body; a rear wheel supported by a rear portion of the rear arm; a shaft configured to pass through a center of the rear wheel and configured to be inserted through the elongated hole; an adjustment mechanism configured to adjust a front-to-rear position of the shaft within the elongated hole; and a fastener member configured to fasten the shaft to the rear arm. The adjustment mechanism includes: a first cover member having a first insertion opening formed therein through which the shaft is to be inserted, the first cover member facing one of a left side of the rear arm and a right side of the rear arm; and a second cover member having a second insertion opening formed therein through which the shaft is to be inserted, the second cover member facing the other one of the left side of the rear arm and the right side of the rear arm. The first cover member covers at least part of a portion of said one of the sides of the rear arm that is disposed forward of the elongated hole and at least part of a portion of said one of the sides of the rear arm that is disposed rearward of the elongated hole, independent of an adjustment position of the adjustment mechanism. The second cover member covers at least part of a portion of said other one of the sides of the rear arm that is disposed forward of the elongated hole and at least part of a portion of said other one of the sides of the rear arm that is disposed rearward of the elongated hole, independent of the adjustment position of the adjustment mechanism.

The above motorcycle is constructed in such a way that the first cover member covers at least part of a portion of one of the sides of the rear arm that is located forward of the elongated hole and at least part of a portion of the same one of the sides of the rear arm that is located rearward of the elongated hole regardless of where the adjustment mechanism is located. Further, the above motorcycle is constructed in such a way that the second cover member covers at least part of a portion of the other one of the sides of the rear arm that is located forward of the elongated hole and at least part of a portion of the same one of the sides of the rear arm that is located rearward of the elongated hole regardless of where the adjustment mechanism is located. Thus, when the shaft supported by the first and second cover members is fastened to the rear arm by a fastener member, its fastening power for the shaft and rear arm acts on a portion of the rear arm located forward of and a portion of the rear arm located rearward of the elongated hole via the first and second cover members. Thus, the shaft and rear arm are fastened more firmly to each other. As such, the rear wheel and rear arm give a stronger feel of a single unit, thereby providing enhanced control of the vehicle body.

The first cover member may cover at least part of a portion of said one of the sides of the rear arm that is disposed upward of the elongated hole and at least part of a portion of said one of the sides of the rear arm that is disposed downward of the elongated hole, independent of the adjustment position of the adjustment mechanism, and the second cover member may cover at least part of a portion of said other one of the sides of the rear arm that is disposed upward of the elongated hole and at least part of a portion of said other one of the sides of the rear arm that is disposed downward of the elongated hole, independent of the adjustment position of the adjustment mechanism.

The first cover member may be formed to cover portions of said one of the sides of the rear arm that completely surround the elongated hole, independent of the adjustment position of the adjustment mechanism. This configuration increases the fastening power of the first cover member acting on a side of the rear arm, thereby allowing the shaft and rear arm to be fastened more firmly to each other.

The second cover member may be formed to cover portions of said other one of the sides of the rear arm that completely surround the elongated hole, independent of the adjustment position of the adjustment mechanism. This configuration increases the fastening power of the second cover member acting on a side of the rear arm, thereby allowing the shaft and rear arm to be fastened more firmly to each other.

The first cover member may be formed such that its thickness increases from its front and rear ends toward portions thereof that surround the first insertion opening. This configuration increases the rigidity of portions of the first cover member that surround the first insertion opening, through which the shaft is to be inserted.

The second cover member may be formed such that its thickness increases from its front and rear ends toward portions thereof that surround the second insertion opening. This configuration increases the rigidity of portions of the second cover member that surround the second insertion opening, through which the shaft is to be inserted.

At least one of the first and second cover members may have a plurality of recesses formed therein. This configuration decreases the weight of the adjustment mechanism.

The first cover member may have a plurality of ribs formed on a side opposite to a side facing the rear arm, extending radially from portions thereof that surround the first insertion opening to edges of the first cover member. This configuration may allow fastening power to be effectively transferred to the outer side of the rear arm.

The first cover member may have a stop formed thereon protruding from a side opposite to a side facing the rear arm, and the shaft may have a protrusion formed thereon protruding outward in a radial direction. When the shaft is inserted through the first insertion opening, the stop and the protrusion cooperate to restrict rotation of the shaft such that the protrusion is disposed in a front-to-rear direction of the vehicle body. This prevents the shaft from being rotated when the shaft and rear arm are fastened to each other by the fastener member.

The above motorcycle may further include a collar disposed between the second cover member and the rear wheel. In this case, the second cover member may have a shelf formed on a side facing the collar for supporting the collar. This configuration prevents the collar located adjacent the second cover member from dropping or rotating.

Other features, elements, steps, characteristics and advantages of the present invention will become more apparent from the following detailed description of the preferred embodiments of the present invention with reference to the attached drawings.

DESCRIPTION OF THE EMBODIMENTS

First Embodiment

Now, the first embodiment of the present invention will be described with reference to drawings.

(Overall Configuration of Motorcycle)

Figure 1:
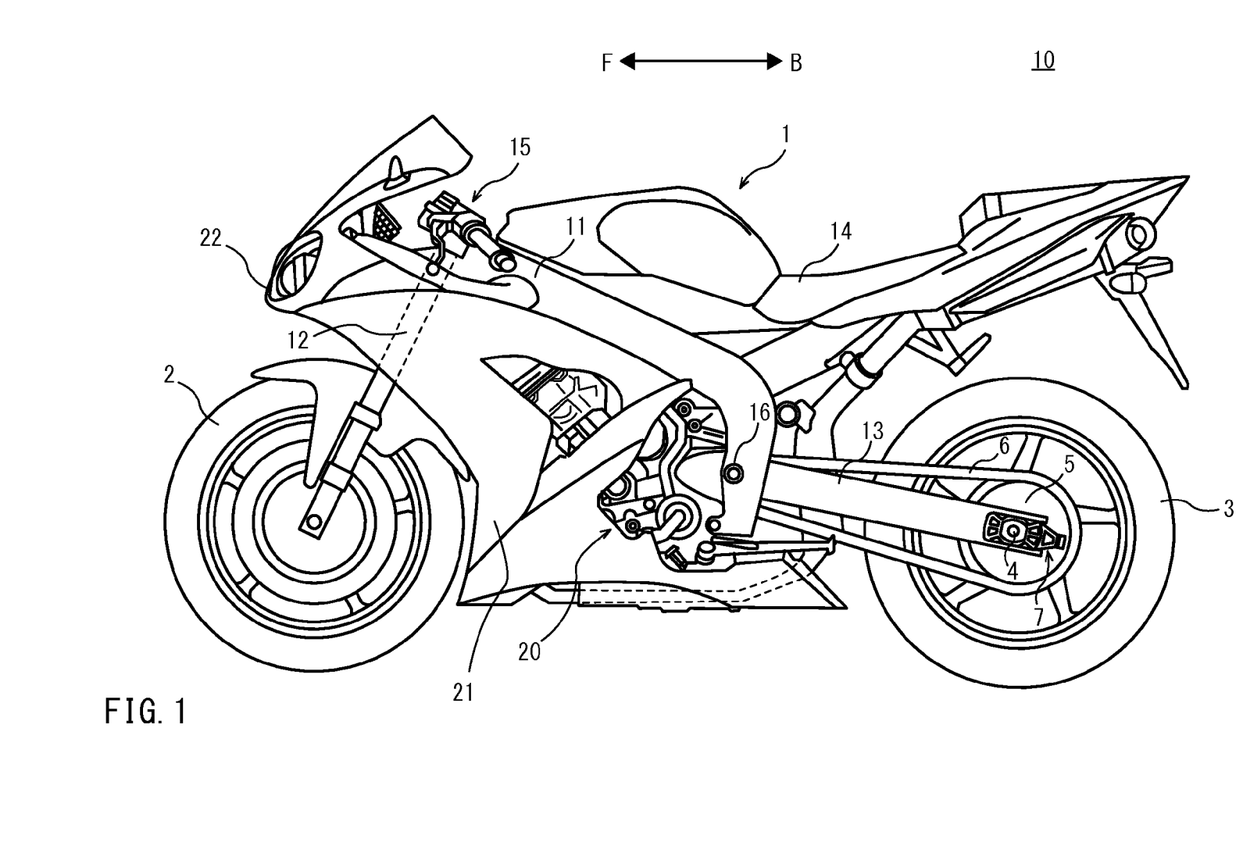
FIG. 1 is a left side view of a motorcycle according to a first embodiment of the present invention.

FIG. 1 is a left side view of a motorcycle 10 according to the first embodiment. As used herein, "front/forward", "rear (ward)", "left", "right", "upper/upward" and "lower/downward" mean directions as perceived by a rider riding the motorcycle 10. In the drawings, arrow "F" indicates the forward direction, and arrow "B" the rearward direction. Arrow "R" indicates the right direction, and arrow "L" the left direction. Arrow "U" indicates the upward direction, and arrow "D" the downward direction.

As shown in FIG. 1, the motorcycle 10 is a racing vehicle. However, the adjustment mechanisms for the rear arm 13 or 13A of the first embodiment and a second embodiment discussed below may be employed in various types of motorcycles other than racing vehicles.

As shown in FIG. 1, the motorcycle 10 includes a vehicle body 1, a front wheel 2 provided at the front of the vehicle body 1, and a rear wheel 3 provided at the rear of the vehicle body 1.

The motorcycle 1 generally includes a body frame 11, a front fork 12, a rear arm 13, a seat 14, and an engine 20. The engine 20 is supported by the body frame 11 and is located rearward of the front wheel 2. The left and right sides of the engine 20 are covered with side cowls 21.

The front fork 12 is attached to a front portion of the vehicle body 1 so as to be inclined rearward with respect to a vertical direction. A front portion of the front fork 12 is covered with the front cowl 22. The bottom end of the front fork 12 rotatably supports the front wheel 2. Handlebars 15 are attached to the top end of the front fork 12.

The motorcycle 10 further includes a shaft 4, which serves as the rotation axle of the rear wheel 3, a driven sprocket 5, a chain 6, and an adjustment member 7. The driven sprocket 5 is attached to the left side of the rear wheel 3. A driving sprocket, not shown, is provided on the engine 20. The chain 6 is wound around the driving sprocket and the driven sprocket 5 to transfer the drive power from the engine 20 to the driven sprocket 5.

The rear arm 13 is located in a rear portion of the vehicle body 1 and extends in a front-to-rear direction, and is attached to the body frame 11 such that it is rotatable about a pivot shaft 16. The shaft 4 is inserted through the rear end of the rear arm 13, which supports the rear wheel 3 via the shaft 4. The adjustment member 7 is provided on a rear portion of the rear arm 13.

Figure 2:
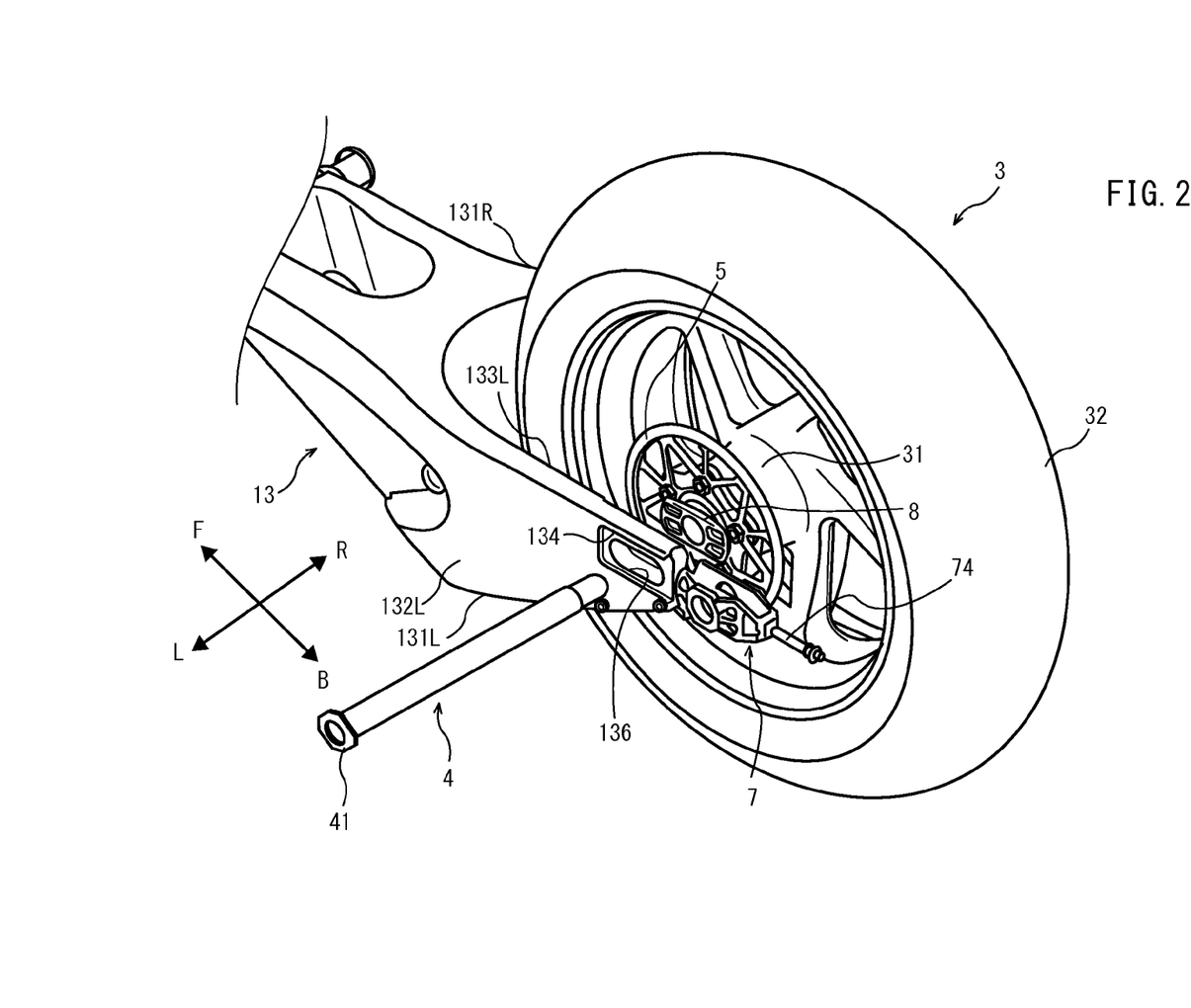
FIG. 2 is a perspective view of a rear portion of the motorcycle according to the first embodiment.

FIG. 2 is a perspective view of the rear portion of the motorcycle 10. To illustrate how the rear arm 13, rear wheel 3, shaft 4 and adjustment member 7 are assembled, FIG. 2 shows these components as disassembled. The shaft 4 is supported at the rear portion of the rear arm 13. The adjustment member 7 may be attached to the rear arm 13 from the rear to secure the shaft 4 to the rear arm 13.

Figure 3:
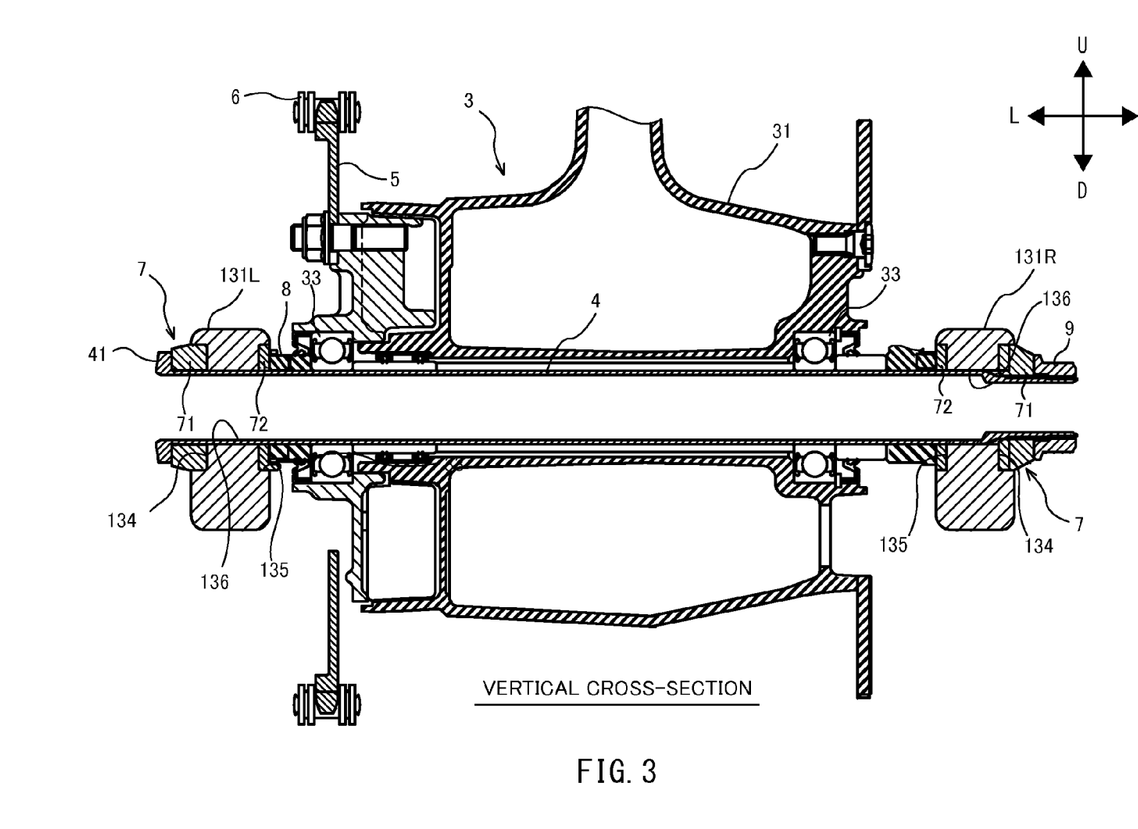
FIG. 3 is a vertical cross section of the axle of the rear wheel, together with its surrounding components, of the motorcycle according to the first embodiment, as viewed from the rear.

FIG. 3 is a vertical cross-section of the axle of the rear wheel 3, together with its surrounding components, of the motorcycle 10, as viewed from the rear. A bearing 33 is provided between the rear wheel 3 and driven sprocket 5 and the shaft 4. The chain 6 is wound around the driven sprocket 5 and the driving sprocket (not shown) provided on the engine. This configuration allows the drive power from the engine to be transferred to the driven sprocket 5 such that the rear wheel 3 rotates about the shaft 4.

(Configuration of Rear Portion of Motorcycle)

As shown in FIGS. 2 and 3, a rear portion of the rear arm 13 is split into two prongs, to the left and right. That is, the rear end of the rear arm 13 includes a right arm 131R and a left arm 131L. The left arm 131L has an outer side 132L and an inner side 133L. A guide groove 134 for guiding the adjustment member 7 is formed on the outer side 132L toward its rear. A guide groove 135 is formed on the inner side 133L at a location that corresponds to the guide groove 134, one to the right and the other to the left. An elongated hole 136 through the left arm 131L, which extends in a front-to-rear direction, is formed in the guide grooves 134 and 135. The right arm 131R has a similar construction as the left arm 131L.

As shown in FIGS. 2 and 3, the rear wheel 3 is located between the left and right arms 131L and 131R. The rear wheel 3 includes a wheel body 31 and a tire 32. As discussed above, the driven sprocket 5 is attached to the left side of the rear wheel 3, and a collar 8, discussed below, is located between the driven sprocket 5 and the inner side 133L of the left arm 131L.

As shown in FIG. 2, the shaft 4 is inserted through the rear portion of the rear arm 13, the adjustment member 7, the driven sprocket 5, and the center of the rear wheel 3. As shown in FIG. 3, a flange 41 is formed on the left end of the shaft 4. The flange 41 restricts the movement of the shaft 4 which has been inserted through the adjustment member 7 toward the right.

(Configuration of Adjustment Member)

Figure 4A:
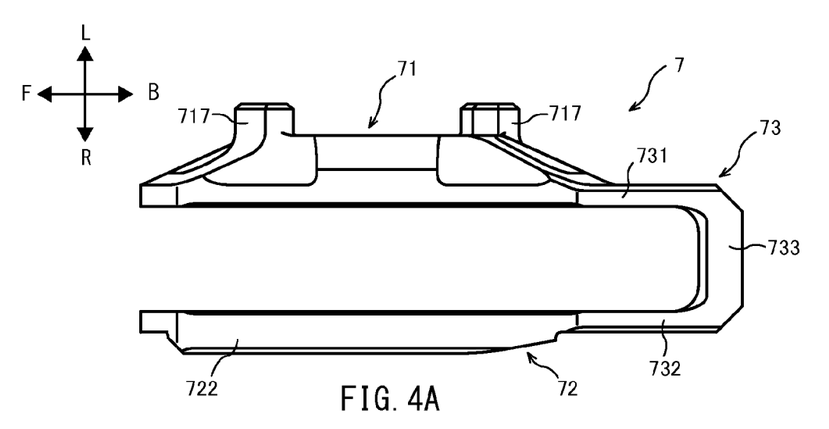
FIG. 4A is a bottom view of the adjustment member of the motorcycle according to the first embodiment.
Figure 4B:
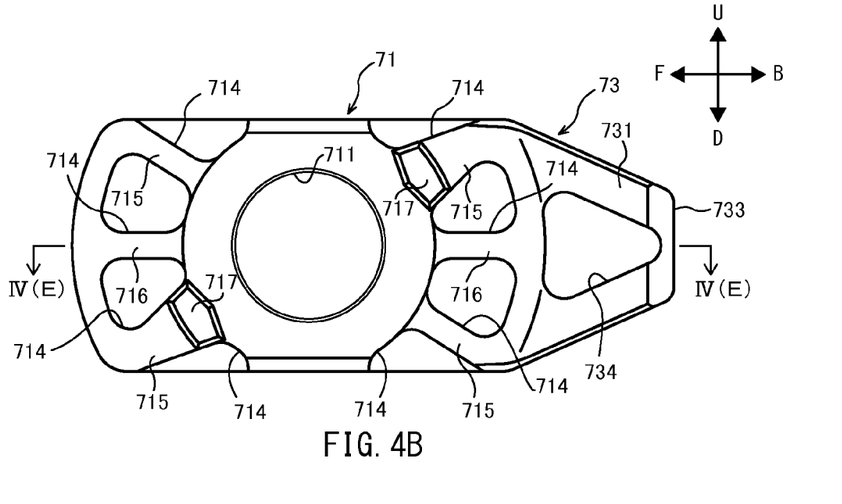
FIG. 4B is a left side view of the adjustment member of the motorcycle according to the first embodiment.
Figure 4C:
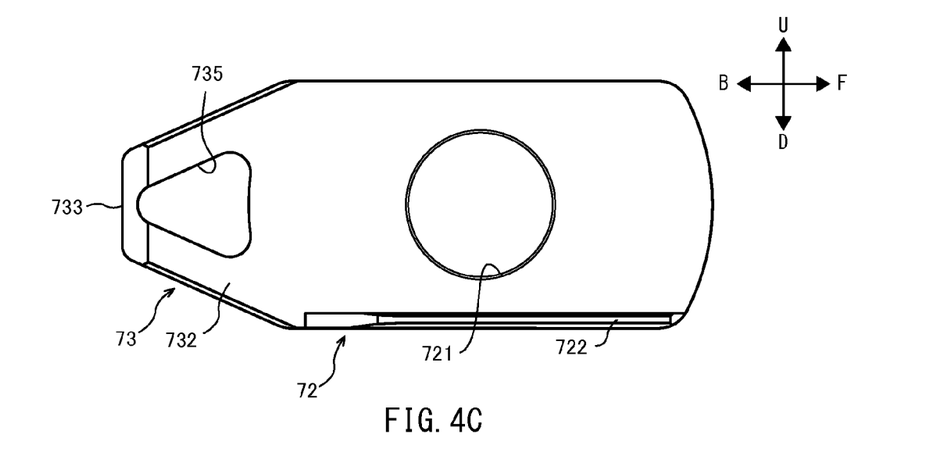
FIG. 4C is a right side view of the adjustment member of the motorcycle according to the first embodiment.
Figure 4D:
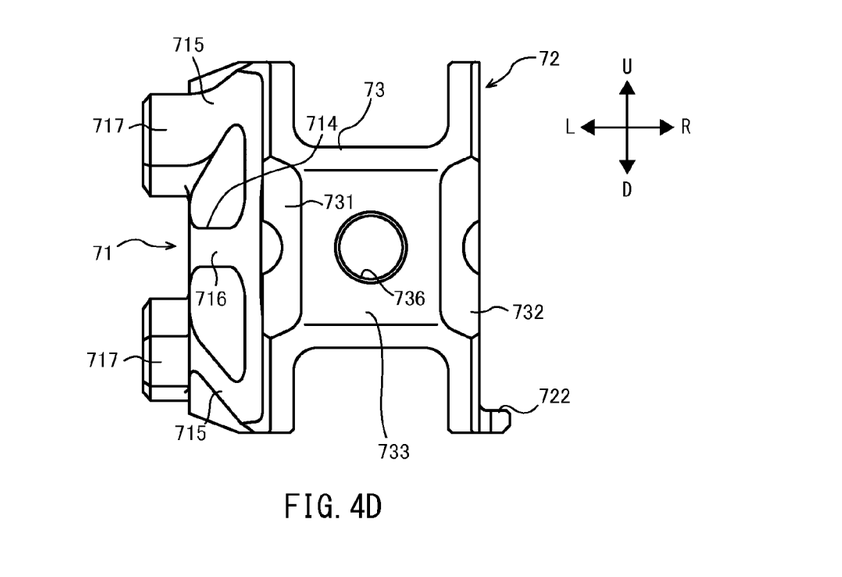
FIG. 4D is a rear view of the adjustment member of the motorcycle according to the first embodiment.
Figure 4E:
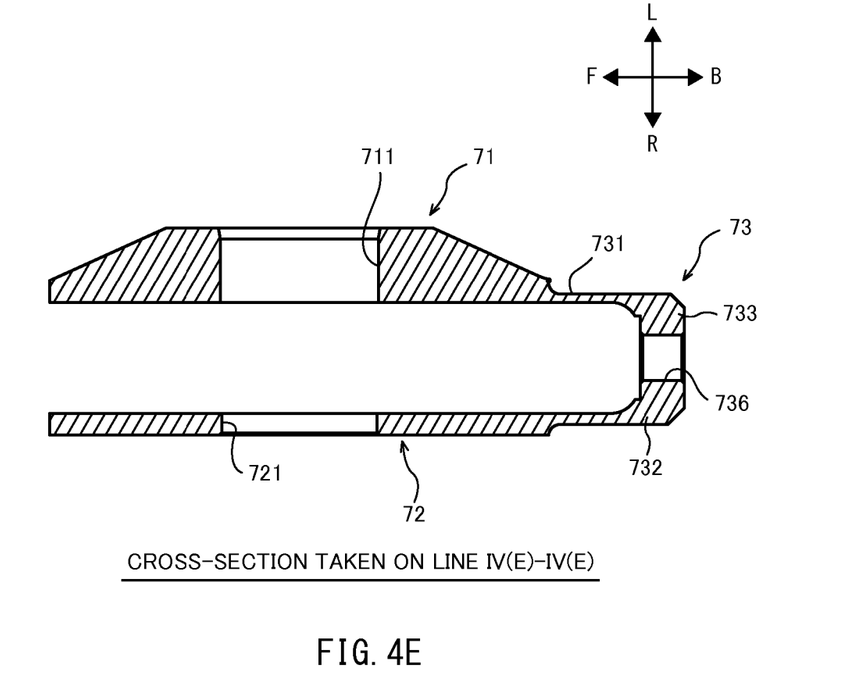
FIG. 4E is a cross-sectional view taken on line IV(E)-IV(E) of FIG. 4B.

Next, the configuration of the adjustment member 7 will be described with reference to FIGS. 4A to 4E. FIGS. 4A to 4E have indications of the forward and rearward, left and right, and/or upward and downward directions, which are directions with respect to the vehicle with the adjustment member 7 attached to the rear arm 13. FIG. 4A is a bottom view of the adjustment member 7. FIG. 4B is a left side view of the adjustment member 7. FIG. 4C is a right side view of the adjustment member 7. FIG. 4D is a rear view of the adjustment member 7. FIG. 4E is a cross-sectional view taken on line IV(E)-IV(E) of FIG. 4B.

An adjustment member 7 is attached to each of the right and left arms 131R and 131L. Because the two adjustment members 7 have generally similar construction, only the adjustment member 7 attached to the left arm 131L will be illustrated. However, it should be noted that the adjustment member 7 attached to the right arm 131R has a second cover member 72, discussed below, that is integrally formed with a brake shoe bracket for holding a brake shoe (not shown).

As shown in FIG. 4A, the adjustment member 7 includes a first cover member 71, a second cover member 72, and a coupling member 73 that is generally U shaped as viewed in a plan view for coupling the first cover member 71 with the second cover member 72. The first cover member 71, second cover member 72 and coupling member 73 are integrally formed. As shown in FIG. 2, a bolt 74 is inserted through the adjustment member 7. In the first embodiment, the adjustment member 7 and bolt 74 constitute the adjustment mechanism for adjusting the front-to-rear position of the shaft 4.

As shown in FIG. 4B, the first cover member 71 has a first insertion opening 711 formed therein, through which the shaft 4 is to be inserted. On the left side of the first cover member 71, a plurality of recesses 714 are formed around the first insertion opening 711, forming a plurality of ribs 715 and 716 that extend radially from portions of the cover member that surround the first insertion opening 711. Each rib 716 extends straight in a front-to-rear direction from portions of the cover member that surround the first insertion opening 711 toward the front or rear edge of the first cover member 71. Each rib 715 extends diagonally from portions of the cover member that surround the first insertion opening 711 toward a corner of the first cover member 71. As shown in FIGS. 4A and 4B, the first cover member 71 has stops 717 formed on portions of the cover member that surround the first insertion opening 711, the stops protruding from the left side of the cover member. As shown in FIG. 4E, the first cover member 71 is formed such that its thickness increases from the front and rear ends toward portions thereof that surround the insertion opening 711.

As shown in FIG. 4C, the second cover member 72 has a second insertion opening 721 formed therein, through which the shaft 4 is to be inserted. As shown in FIG. 4A, a shelf 722 is formed on the right side of the second cover member 72, extending along the bottom edge thereof and protruding to the right.

As shown in FIG. 4A, the coupling member 73 includes a left wall 731 coupled with the rear edge of the first cover member 71, a right wall 732 coupled with the rear edge of the second cover member 72, and a rear wall 733 for coupling the left wall 731 with the right wall 732. As shown in FIGS. 4B and 4C, the left and right walls 731 and 732 are each shaped as a trapezoid with a short base located toward the rear, as viewed in a side view. A recess 734 is formed in the left wall 731, while a recess 735 is formed in the right wall 732. As shown in FIG. 4D, a bolt hole 736 is formed in the rear wall 733.

(Configuration of Collar)

Figure 5A:
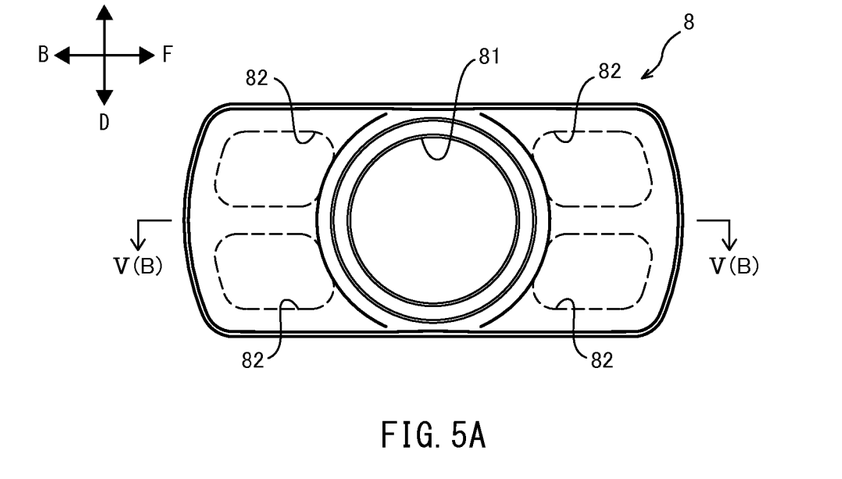
FIG. 5A is a right side view of the collar of the motorcycle according to the first embodiment.
Figure 5B:
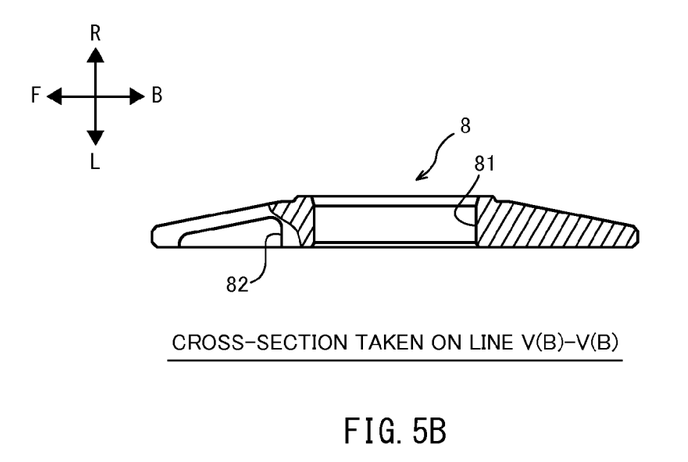
FIG. 5B is a cross-sectional view taken on line V(B)-V(B) of FIG. 5A.

Next, the configuration of the collar 8 will be described with reference to FIGS. 5A and 5B. FIG. 5A is a right side view of the collar 8. FIG. 5B is a cross-section taken on line V(B)-V(B) of FIG. 5A. As shown in FIG. 5A, the collar 8 has a third insertion opening 81 formed therein, through which the shaft 4 is to be inserted. As shown in FIG. 5B, the collar 8 is formed such that its thickness increases from the front and rear edges toward portions of the collar that surround the third insertion opening 81. A plurality of recesses 82 are formed on the left side of the collar 8.

(Shaft and Rear Arm as Fastened)

Figure 6:
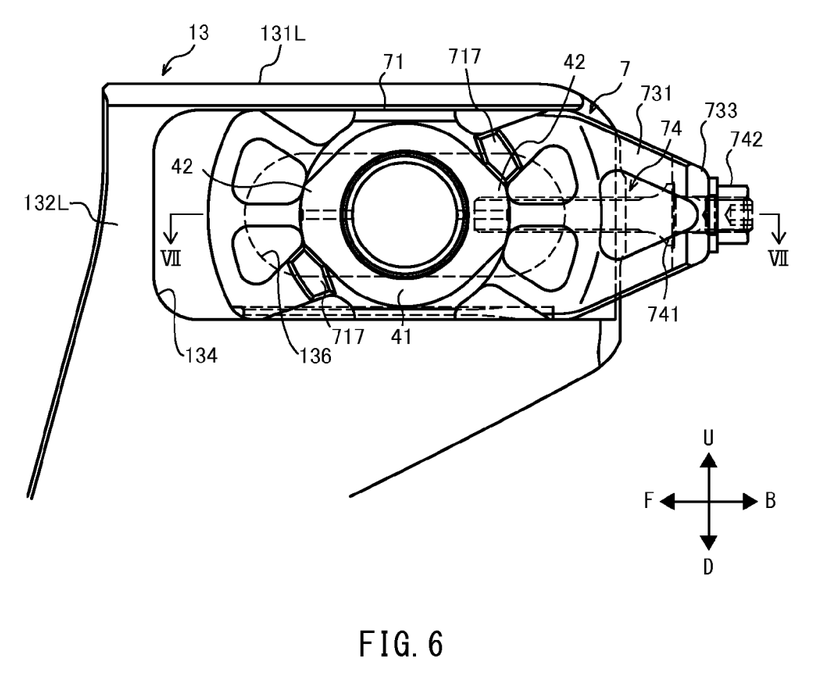
FIG. 6 is a left side view of the shaft and rear arm of the motorcycle according to the first embodiment as fastened to each other.
Figure 7:
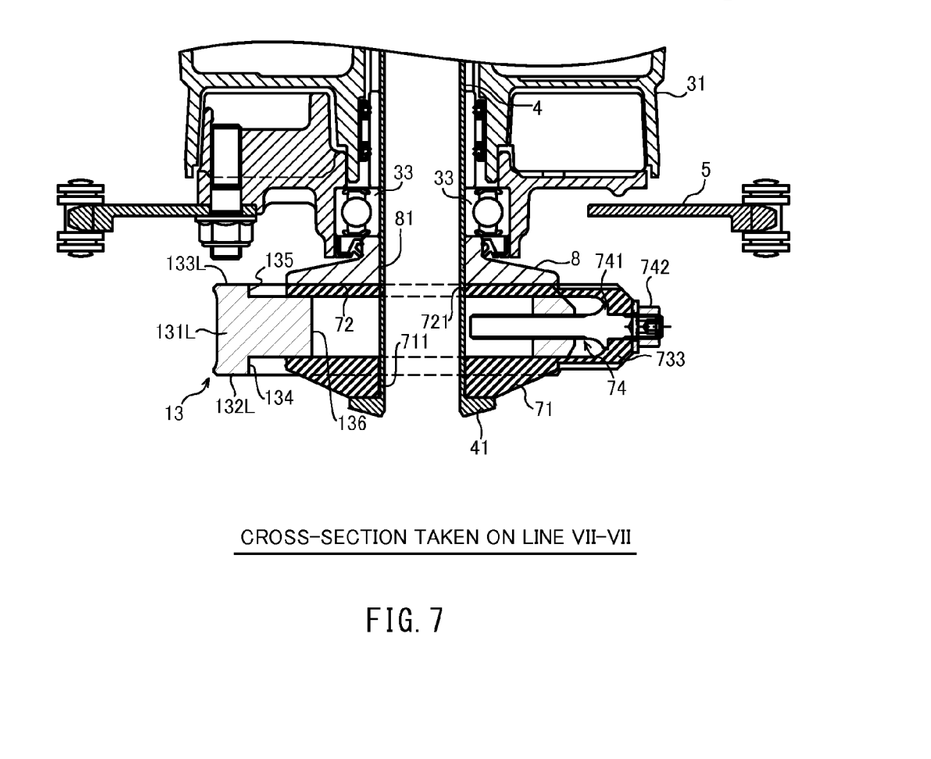
FIG. 7 is a cross-sectional view taken on line VII-VII of FIG. 6.

FIG. 6 is a left side view of the shaft 4 and rear arm 13 as fastened to each other. FIG. 7 is a cross-section taken on line VII-VII of FIG. 6. As shown in FIGS. 2, 6 and 7, a bolt 74 is inserted through the bolt hole 736 of the rear wall 733. As shown in FIGS. 6 and 7, the bolt 74 has a large-diameter portion 741 located forward of the rear wall 733, which is pressed against the rear wall 733. A nut 742 is attached to the rear end of the bolt 74, which is located rearward of the rear wall 733. This configuration restricts the movement of the bolt 74 in a front-to-rear direction.

As discussed above, an end of the shaft 4 has a flange 41 for restricting the movement of the shaft 4 that has been inserted through the adjustment member 7. The flange 41 is shaped like an almond as viewed in a side view, and thus has protrusions 42 protruding radially outward with respect to the shaft 4. As the protrusions 42 are in contact with the stops 717 on the adjustment member 7, as discussed below, the rotation of the shaft 4 is restricted such that the protrusions 42 of the flange 41 are disposed in a front-to-rear direction of the vehicle body. As shown in FIG. 3, the fastener member 9 is attached to the right end of the shaft 4. In the present embodiment, the fastener member 9 is a nut.

(Method of Fastening Shaft to Rear Arm)

Next, how the shaft 4 may be fastened to the rear arm 13 in the context of the motorcycle 10 thus constructed will be described.

An adjustment member 7 is attached to each of the right and left arms 131R and 131L of the rear arm 13. Only the method of attaching an adjustment mechanism 7 to the left arm 131L will be described herein because the method of attaching an adjustment member 7 to the right arm 131R is generally similar to that of the left arm 131L.

As shown in FIGS. 6 and 7, regarding the left arm 131L, the first cover member 71 is positioned in the guide groove 134 on the outer side 132L, while the second cover member 72 is positioned in the guide groove 135 on the inner side 133L. At this time, the first cover member 71 covers portions of the guide groove 134 that completely surround the elongated hole 136. The second cover member 72 cover portions of the guide groove 135 that completely surround the elongated hole 136. The collar 8 is positioned to the right of the second cover member 72 and is supported by the shelf 722 (see FIGS. 4A and 4C). That is, the bottom of the collar 8 is located on the upper side of the shelf 722, which protrudes to the right. This prevents the collar 8 from dropping or rotating.

As shown in FIG. 7, the shaft 4 is inserted through the first insertion opening 711 in the first cover member 71, the elongated hole 136 in the left arm 131L, the second insertion opening 721 in the second cover member 72, and the third insertion opening 81 in the collar 8. Further, the shaft 4 passes through the center of the driven sprocket 5 and the center of the wheel body 31. The flange 41 on the shaft 4 is pressed against the first cover member 71. As shown in FIG. 3, the shaft 4 is further inserted through the right arm 131R and the adjustment member 7 attached to the right arm 131R, and a nut 9 is attached to the right end of the shaft. Then, the nut 9 is rotated in a predetermined direction to tighten such that the shaft 4 is fastened to the rear arm 13. At this time, rotating the nut 9 may rotate the shaft 4; however, as shown in FIG. 6, the rotation of the shaft 4 is restricted as the protrusions 42 on the flange 41 contact the stops 717 on the first cover member 71.

To change the front-to-rear position of the shaft 4, the nut 9 may be loosened and both adjustment members 7 may be moved forward or rearward along the guide grooves 134 and 135. Because the shaft 4 is inserted through the first and second insertion openings 711 and 721, it moves forward or rearward along with the adjustment members 7. A front-to-rear position of the shaft 4 and adjustment members 7 may be decided on and the nut 9 may be tightened such that the shaft 4 is fastened to the rear arm 13 again. After each adjustment member 7 is moved forward or rearward, the first and second cover members 71 and 72 of the adjustment member 7 still covers portions of the rear arm that completely surround the elongated hole 136. For example, the front-to-rear dimension of the first and second cover members 71 and 72 may be larger than the elongated hole 136 by the distance that the shaft 4 can be moved such that the first and second cover members 71 and 72 cover portions of the rear arm that completely surround the elongated hole 136 regardless of the adjustment position of the adjustment mechanism. Alternatively, a plurality of adjustment members 7 with different front-to-rear dimensions may be prepared and one adjustment member 7 may be replaced by another as necessary depending on the distance that the shaft 4 may be moved such that the first and second cover members 71 and 72 cover portions of the rear arm that completely surround the elongated hole 136 regardless of the adjustment position of the adjustment mechanism.

Second Embodiment

Next, the second embodiment of the present invention will be described with reference to drawings.

Figure 8:
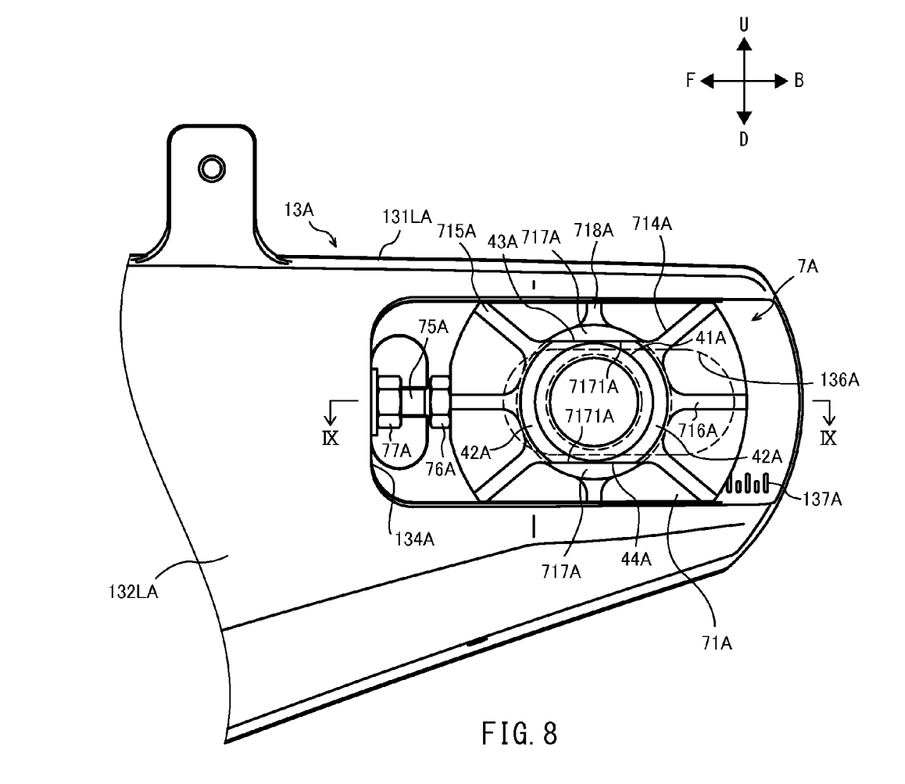
FIG. 8 is a left side view of a shaft and rear arm of a motorcycle according to a second embodiment of the present invention as fastened to each other.
Figure 9:
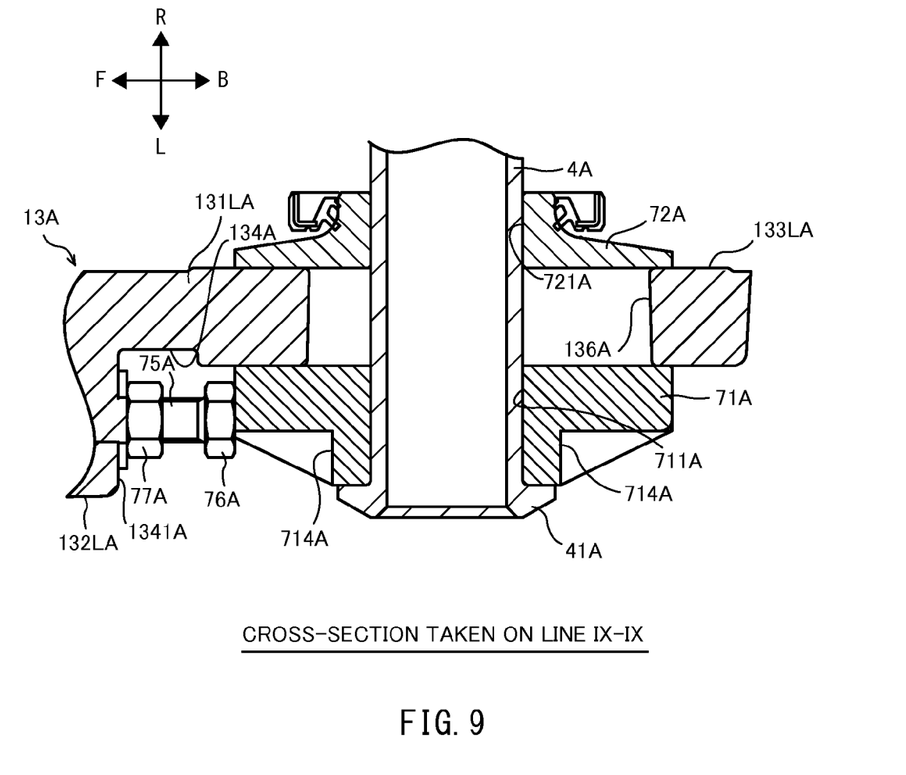
FIG. 9 is a cross-sectional view taken on line IX-IX of FIG. 8.

The overall configuration of a motorcycle according to the second embodiment is similar to that of the motorcycle 10 according to the first embodiment shown in FIG. 1. However, in the motorcycle according to the second embodiment, the configuration of the adjustment member 7A is different from that of the adjustment member 7 of the first embodiment, as illustrated in FIGS. 8 and 9. Further, in the motorcycle according to the second embodiment, no guide groove 135 is formed on the inner side of each of the right arm (not shown) and left arm 131LA of the rear arm 13A.

FIG. 8 is a left side view of the shaft 4A and the rear arm 13A of the motorcycle, according to the second embodiment, as fastened to each other. FIG. 9 is a cross-sectional view taken on line IX-IX of FIG. 8. While the adjustment member 7 according to the first embodiment includes first and second cover members 71 and 72 that are integrally formed, the adjustment member 7A according to the second embodiment has separate first and second cover members 71A and 72A, as shown in FIG. 9. A bolt 75A and nuts 76A and 77A are attached to the adjustment member 7A. In the second embodiment, the adjustment member 7A, bolt 75A and nuts 76A and 77A constitute the adjustment mechanism for adjusting the front-to-rear position of the shaft 4A.

As shown in FIG. 9, the first cover member 71A has a first insertion opening 711A formed therein, similar to that of the first embodiment. As shown in FIG. 8, a plurality of recesses 714A and a plurality of ribs 715A and 716A are formed on the left side of the first cover member 71A, similar to those of the first embodiment. In addition, in the second embodiment, a plurality of ribs 718A extending in a top-to-bottom direction are provided on the left side of the first cover member 71A.

As shown in FIG. 9, the second cover member 72A has a second insertion opening 721A formed therein, similar to that of the first embodiment. As shown in FIG. 9, the second cover member 72A is formed such that its thickness increases from the front and rear ends toward portions of the cover member that surround the second insertion opening 721A. The second cover member 72A also serves as a collar.

As shown in FIG. 9, the bolt 75A extends through the front wall 1341A of the guide groove 134A in a front-to-rear direction, and a nut 76A is attached to the bolt's rear end. As shown in FIGS. 8 and 9, the nut 76A is in contact with the first cover member 71A. The position of the first cover member 71A is determined by the amount of protrusion of the bolt 75A from the front wall 1341A. The rearward movement of the bolt 75A is restricted by a nut 77A attached to it adjacent the front wall 1341A.

In the second embodiment, two protrusions 42A are formed on the flange 41A, similar to those of the first embodiment. Flat surfaces 43A and 44A are formed between the protrusions 42A. Stops 717A are formed in upper and lower portions of the first cover member 71A. A flat surface 7171A is formed on each stop 717A. The flat surface 7171A of the upper stop 717A is located close to the upper flat surface 43A of the flange 41A, while the flat surface 7171A of the lower stop 717A is located close to the lower flat surface 44A of the flange 41A. As such, the rotation of the shaft 4 is restricted such that the protrusions 42A on the flange 41A are disposed in a front-to-rear direction of the vehicle body. Further, in the second embodiment, a scale 137A indicative of the current front-to-rear position of the shaft 4A is provided in the guide groove 134A of the rear arm 13A.

The method of fastening the shaft 4A to the rear arm 13A in the second embodiment is generally similar to that of the first embodiment. In the second embodiment, too, the first cover member 71A is positioned in the guide groove 134A of the left arm 131LA so as to cover portions of the rear arm that completely surround the elongated hole 136A. The second cover member 72A is positioned on the inner surface 133LA of the left arm 131LA so as to cover portions of the rear arm that completely surround the elongated hole 136A.

To change the front-to-rear position of the shaft 4A, the nut 9 (FIG. 3) is loosened and then the nut 77A is operated to change the amount of protrusion of the bolt 75A from the front wall 1341A. Thus, the first cover member 71A moves forward or rearward. The second cover member 72A and the shaft 4A also move along with the first cover member 71A. A forward force is applied to the adjustment member 7A by the chain 6 (FIG. 1). Thereafter, ceasing to operate the nut 77A fixes the front-to-rear position of the first cover member 71A, second cover member 72A and shaft 4A, and tightening the nut 9 fastens the shaft 4A to the rear arm 13A. However, similar to the first embodiment, the first and second cover members 71A and 72A may be replaced with those with different front-to-rear dimensions, as necessary, such that the first and second cover members 71A and 72A cover portions of the rear arm that completely surround the elongated hole 136A regardless of the adjustment position of the adjustment mechanism.

Thus, according to the above embodiments, the first cover member 71 and 71A covers portions of the outer side 132L or 132LA of the rear arm 13 or 13A that completely surround the elongated hole 136 or 136A regardless of the adjustment position of the adjustment mechanism. The second cover member 72 or 72A covers portions of the inner side 133L or 133LA of the rear arm 13 or 13A that completely surround the elongated hole 136 or 136A regardless of the adjustment position of the adjustment mechanism. As such, when the shaft 4 or 4A is fastened to the rear arm 13 or 13A by the nut 9, the first cover member 71 or 71A and the second cover member 72 or 72A are pressed against portions of the rear arm that completely surround the elongated hole 136 or 136A. That is, the fastening power received by the shaft 4 or 4A and rear arm 13 or 13A acts not only on portions of the rear arm located upward and downward of the elongated hole 136 or 136A but also on portions of the rear arm located forward and rearward of the elongated hole 136 or 136A, thereby firmly fastening the shaft 4 or 4A to the rear arm 13 or 13A. As such, the rear wheel 3 and the rear arm 13 or 13A will give a stronger feel of a single unit, thereby providing enhanced control of the vehicle body.

The tension by the chain 6 applies a large front-to-rear force to the shaft 4 or 4A of the rear wheel 3. This front-to-rear force is transferred to the rear arm 13 or 13A via the adjustment member 7 or 7A. If the adjustment member 7 or 7A were in contact with the rear arm 13 or 13A only at positions upward and downward of the elongated hole 136 or 136A, the sides of the rear arm 13 or 13A may not sufficiently catch the force received by the shaft 4 or 4A. This would result in some loosening-up of the securing of components including the shaft 4 or 4A and adjustment member 7 or 7A to the rear arm 13 or 13A. It is desirable to reduce this loosening-up to enhance the handling comfort of the vehicle. In the motorcycle according to the above embodiments, the adjustment member 7 or 7A is also in contact with the rear arm 13 or 13A at positions forward and rearward of the elongated hole 136 or 136A. Thus, the force received by the shaft 4 or 4A is sufficiently caught by the sides of the rear arm 13 or 13A such that components including the shaft 4 or 4A and adjustment member 7 or 7A are firmly secured to the rear arm 13 or 13A. This will enhance the handling comfort of the vehicle.

According to the above embodiments, the first cover member 71 or 71A, the second cover member 72A and the collar 8 are constructed such that their thickness around the insertion opening is larger than that at the front and rear ends. This will enhance the rigidity of the adjustment member 7 or 7A and collar 8.

According to the above embodiments, recesses 714 or 714A are formed in the first cover member 71 or 71A. Recesses 82 are formed in the collar 8. This will reduce the weight of the adjustment member 7 or 7A and collar 8.

Further, according to the above embodiments, the first cover member 71 or 71A includes ribs 716 or 716A extending from portions of the cover member that surround the first insertion opening 711 or 711A toward the corners of the cover member. The ribs 716 or 716A will allow the fastening power received by the shaft 4 or 4A and rear arm 13 or 13A to be effectively transferred to the corners of the cover member, which are located farthest from the center of the cover member.

While the first and second embodiments of the present invention have been described, the present invention is not limited to these embodiments, and various modifications are possible without departing from the spirit of the invention.

Figure 10:
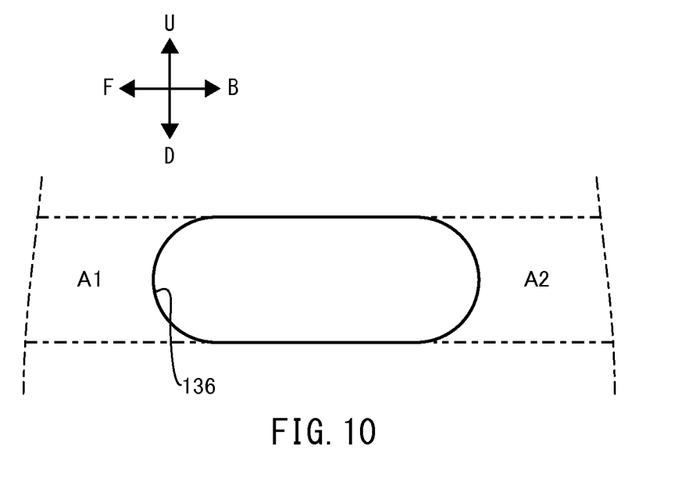
FIG. 10 illustrates the definition of forward and rearward of the elongated hole of the motorcycle of the present invention.

For example, according to the above embodiments, the first and second cover members cover portions of the rear arm that completely surround the elongated hole; however, the present invention is not limited to such a configuration. It is also contemplated that the first cover member may cover at least part of a portion of the outer side of the rear arm located forward of the elongated hole and at least part of a portion thereof located rearward of the elongated hole, and at least part of a portion thereof located upward of the elongated hole and at least part of a portion thereof located downward of the elongated hole. It is further contemplated that the second cover member may cover at least part of a portion of the inner side of the rear arm located forward of the elongated hole and at least part of a portion thereof located rearward of the elongated hole, and at least part of a portion thereof located upward of the elongated hole and at least part of a portion thereof located downward of the elongated hole. Portions located forward and rearward of the elongated hole may be represented as regions A1 and A2 shown in FIG. 10, which are located forward and rearward of the elongated hole 136 and that do not exceed the top-to-bottom dimension, i.e. width, of the elongated hole 136. The forward and rearward directions as well as upward and downward directions shown in FIG. 10 are directions with respect to the vehicle with the adjustment member attached to the rear arm.

It is also contemplated that the portions of the rear arm covered with the first and second cover members may be located forward and rearward of the elongated hole as well as upward and downward of the elongated hole, and such portions may be separated from the elongated hole. For example, an opening may be formed in the first and second cover members, and portions of the rear arm that surround the elongated hole may be exposed at the opening. In such implementations, the first and second cover members cover portions of the rear arm located forward and rearward as well as upward and downward of the elongated hole that are located outward of the opening.

According to the above embodiments, the first and second cover members are each formed such that their thickness increases from their front and rear ends toward portions thereof that surround the respective insertion opening; however, the present invention is not limited to such a configuration. The shape of the first and second cover members may be determined as necessary depending on the required rigidity and the material used.

According to the above embodiments, a plurality of recesses are formed in the first cover member; alternatively, only one recess may be formed in the first cover member. Still alternatively, no recess may be formed in the first cover member.

According to the above embodiments, no recess is formed in the second cover member; alternatively, at least one recess may be formed in the second cover member.

According to the above embodiment, a plurality of ribs are provided on the first cover member; however, it is not necessary to provide a plurality of ribs.

According to the above embodiments, stops are provided on the first cover member and protrusions are provided on the flange of the shaft to restrict the rotation of the shaft; alternatively, a known shaft rotation restriction mechanism may be employed.

While preferred embodiments of the present invention have been described above, it is to be understood that variations and modification will be apparent to those skilled in the art without departing the scope and spirit of the present invention. The scope of the present invention, therefore, is to be determined solely by the following claims.

What is claimed is:

1. A motorcycle comprising:
    a vehicle body including a body frame;
    a rear arm supported by the body frame, the rear arm being rotatable in a top-to-bottom direction, an elongated hole being formed in the rear arm and extending in a front-to-rear direction of the vehicle body;
    a rear wheel supported by a rear portion of the rear arm;
    a shaft configured to pass through a center of the rear wheel and configured to be inserted through the elongated hole;
    an adjustment mechanism configured to adjust a front-to-rear position of the shaft within the elongated hole; and
    a fastener member configured to fasten the shaft to the rear arm;
    wherein the adjustment mechanism includes:
        a first cover member having a first insertion opening formed therein through which the shaft is to be inserted, the first cover member facing one of a left side of the rear arm and a right side of the rear arm; and
        a second cover member having a second insertion opening formed therein through which the shaft is to be inserted, the second cover member facing the other one of the left side of the rear arm and the right side of the rear arm;
    wherein the first cover member covers at least part of a portion of said one of the left and right sides of the rear arm that is disposed forward of the elongated hole and at least part of a portion of said one of the left and right sides of the rear arm that is disposed rearward of the elongated hole, independent of an adjustment position of the adjustment mechanism; and
    wherein the second cover member covers at least part of a portion of said other one of the left and right sides of the rear arm that is disposed forward of the elongated hole and at least part of a portion of said other one of the left and right sides of the rear arm that is disposed rearward of the elongated hole, independent of the adjustment position of the adjustment mechanism.

2. The motorcycle according to claim 1, wherein
    the first cover member covers at least part of a portion of said one of the left and right sides of the rear arm that is disposed upward of the elongated hole and at least part of a portion of said one of the left and right sides of the rear arm that is disposed downward of the elongated hole, independent of the adjustment position of the adjustment mechanism; and
    the second cover member covers at least part of a portion of said other one of the left and right sides of the rear arm that is disposed upward of the elongated hole and at least part of a portion of said other one of the left and right sides of the rear arm that is disposed downward of the elongated hole, independent of the adjustment position of the adjustment mechanism.

3. The motorcycle according to claim 1, wherein the first cover member covers portions of said one of the left and right sides of the rear arm that completely surround the elongated hole, independent of the adjustment position of the adjustment mechanism.

4. The motorcycle according to claim 1, wherein the second cover member covers portions of said other one of the left and right sides of the rear arm that completely surround the elongated hole, independent of the adjustment position of the adjustment mechanism.

5. The motorcycle according to claim 1, wherein the first cover member is formed such that its thickness increases from its front and rear ends toward portions thereof that surround the first insertion opening.

6. The motorcycle according to claim 1, wherein the second cover member is formed such that its thickness increases from its front and rear ends toward portions thereof that surround the second insertion opening.

7. The motorcycle according to claim 1, wherein at least one of the first and second cover members has a plurality of recesses formed therein.

8. The motorcycle according to claim 1, wherein the first cover member has a plurality of ribs formed on a side opposite to a side facing the rear arm, extending radially from portions thereof that surround the first insertion opening to edges of the first cover member.

9. The motorcycle according to claim 1, wherein:
    the first cover member has a stop formed thereon protruding from a side opposite to a side facing the rear arm;
    the shaft has a protrusion formed thereon protruding outward in a radial direction; and
    when the shaft is inserted through the first insertion opening, the stop and the protrusion cooperate to restrict rotation of the shaft such that the protrusion is disposed in a front-to-rear direction of the vehicle body.

10. The motorcycle according to claim 1, further comprising a collar disposed between the second cover member and the rear wheel;
    wherein the second cover member has a shelf formed on a side facing the collar for supporting the collar.

* * * * *